United States Patent
Luft

(10) Patent No.: US 7,530,607 B2
(45) Date of Patent: May 12, 2009

(54) QUICK TORQUE COUPLING

(76) Inventor: Peter A. Luft, 24 San Carlos Ave., El Cerrito, CA (US) 94530

( * ) Notice: Subject to any disclaimer, the term of this patent is extended or adjusted under 35 U.S.C. 154(b) by 359 days.

(21) Appl. No.: 11/327,815

(22) Filed: Jan. 6, 2006

(65) Prior Publication Data

US 2006/0171776 A1 Aug. 3, 2006

Related U.S. Application Data

(60) Provisional application No. 60/643,617, filed on Jan. 12, 2005.

(51) Int. Cl.
F16L 21/00 (2006.01)
(52) U.S. Cl. ........................ 285/402; 285/913
(58) Field of Classification Search ............... 285/84, 285/358, 360, 362, 86, 81, 913, 401, 402, 285/396
See application file for complete search history.

(56) References Cited

U.S. PATENT DOCUMENTS

| | | | |
|---|---|---|---|
| 1,039,536 A * | 9/1912 | Hill | 285/86 |
| 1,128,634 A | 2/1915 | Talbot | |
| 2,500,276 A * | 3/1950 | Church | 285/86 |
| 3,201,151 A * | 8/1965 | Westveer | 285/86 |
| 3,253,842 A | 5/1966 | Rabe | |
| 4,512,596 A | 4/1985 | Obrecht | |
| 4,718,568 A | 1/1988 | Dal Palu | |
| 5,145,276 A | 9/1992 | Demange | |
| 5,188,399 A | 2/1993 | Durina | |
| 5,431,507 A | 7/1995 | Smilanick | |
| 5,474,501 A | 12/1995 | Teng | |
| 5,582,489 A | 12/1996 | Marzio et al. | |
| 5,857,713 A | 1/1999 | Horimoto | |
| 6,168,213 B1 | 1/2001 | Muller | |
| 6,382,680 B1 | 5/2002 | Horimoto | |
| 2003/0184091 A1 | 10/2003 | Ricard | |

* cited by examiner

Primary Examiner—Aaron M Dunwoody

(57) ABSTRACT

A coupling for mechanically connecting modular tubular struts of a positioning apparatus or space frame, comprising a pair of toothed rings (10, 12) attached to separate strut members (16), the teeth (18, 20) of the primary rings (10, 12) mechanically interlocking in both an axial and circumferential manner, and a third part comprising a sliding, toothed collar (14) the teeth (22) of which interlock the teeth (18, 20) of the primary rings (10, 12), preventing them from disengaging, and completely locking the assembly together. A secondary mechanism provides a nesting force for the collar, and/or retains it. The coupling is self-contained and requires no external tools for installation, and can be assembled with gloved hands in demanding environments. No gauging or measured torque is required for assembly. The assembly can easily be visually inspected to determine a "go" or "no-go" status. The coupling is compact and relatively light-weight. Because of it's triply interlocking teeth, the connection is rigid. The connection does not primarily rely on clamps, springs or friction based fasteners, and is therefore reliable in fail-safe applications.

24 Claims, 9 Drawing Sheets

QUICK TORQUE COUPLING

CROSS-REFERENCE TO RELATED APPLICATIONS

This application claims the benefit of U.S. Provisional Patent Application No. 60/643,617, which was filed Jan. 12, 2005.

FEDERALLY SPONSORED RESEARCH

The United States government has rights in this invention pursuant to Contract No. DE-AC03-76SF00098 between the United States Department of Energy and the University of California, for the operation of Lawrence Berkeley National Laboratory.

BACKGROUND OF THE INVENTION

This invention relates to the mechanical connection of modular structural elements, such as those of a positioning apparatus or space frame. More particularly, the invention relates to the design of disconnectable couplings functioning as a means to this end.

In the context of designing a positioning apparatus, the need arises to design structural elements of same that are rigid, therefore permitting accuracy of placement. Such an apparatus must also transmit mechanical power in order to execute placement, e.g. as in the case of an articulated robot arm. Positioning per se implies using an apparatus to move an object in a given linear direction and/or rotate it. Thus, an active structural element of a positioning apparatus must be able to transmit linear force as well as rotational force, commonly called torque.

Further, in the context of designing a positioning apparatus that can be readily assembled from or disassembled into a set of modular components, the coupling design used in connecting these components to each other must reliably transmit torque as well as linear force, with mechanical precision. Here, this kind of coupling will be called a "Torque Coupling", not to be confused with a conventional power coupling or clutch.

To maintain positional accuracy, a Torque Coupling must be capable of being accurately and repeatably assembled, and it must be capable of transmitting linear force and/or torque without mechanical slippage, either linear or rotational. These requirements distinguish the design of a Torque Coupling from that of a conventional power coupling or clutch, such as used in the drive shaft of a motor. In fact, for reasons of practicality the latter are deliberately designed to accommodate misalignment, rendering them unsuitable for true kinematic applications.

As it happens, a parallel context exists for which a Torque Coupling is suitable, that of a collapsible Space Frame, i.e. a space frame which can readily be assembled from or disassembled into modular elements. Here, the term "Space Frame" means a rigid assembly of predominantly linear struts, connected to each other at their ends. Rigidity is obtained by the organization of the assembly into a two or three dimensional system of triangles, since the triangle is the only fundamentally rigid shape that can be formed by linear struts. These triangles need not be regular.

By their nature, Space Frames are both rigid and lightweight, making them suitable for applications requiring both physical stability and economy of material (i.e. mass), such as bicycle frames, telescope mirror supports, space stations, booms of construction cranes, truss-type bridges, and various types of scientific apparatus.

Because of the intrinsic geometry of a Space Frame, its component struts can only be subjected to linear (tensile/compressive) or rotational (torsional) forces—but not bending—as the entire assembly is subject to a variety of loads. Therefore, the fundamental requirements of a Torque Coupling connecting strut components in a Space Frame are the same as for a positioning apparatus, i.e., the Torque Coupling must be capable of being accurately and repeatably assembled, and must reliably transmit linear and/or rotational force without mechanical slippage.

Previously, designs such as the Bicycle Torque Coupling (BTC) of Smilanick, U.S. Pat. No. 5,431,507, utilized a pair of cylindrical fittings bonded to mating strut ends. These fittings each had a set of teeth that interlocked with each other as the two fitting halves were clamped together. This interlocking prevented mechanical slippage due to rotational force. The two fittings were clamped together by a captive threaded casing, or "nut", that slid over one fitting and screwed onto external threads on the other fitting. This nut contained external notches used for tightening with a specialty wrench. The BTC is produced commercially by the S and S Machine Co. of Roseville, Calif., and is used to attach collapsible bicycle frames together.

The BTC-type design presents several problems in certain applications involving a positioning apparatus. First, it is possible to assemble the two fittings together such that the teeth actually touch at their tips instead of interdigitating. In this position it is also possible to engage a few threads of the nut and hold the assembly together, giving the impression that the assembly has been correctly assembled, even though it's actually at risk of failing in torsion. Also, this mis-assembly will cause the positioning apparatus as a whole to be misaligned. As mentioned, it cannot be readily determined by visual inspection whether a BTC-type coupling has been incorrectly assembled in this manner. Therefore it is problematic to validate an assembly with many couplings, e.g. a field application. Therefore the BTC and similar designs are unreliable in fail-safe applications, i.e. applications in which failure would be a high-consequence event.

Second, an external wrench is required to assemble a BTC-type coupling. This tool can be misplaced or lost, rendering emergency assembly or disassembly problematic. Worse, in an installation where loose items can cause catastrophic damage by falling into sensitive equipment, an external wrench requires tethering, which can complicate assembly. Furthermore, an external wrench may be difficult to use in environments where the apparatus must be assembled in difficult or hostile environments requiring a technician to wear gloves. Also, an external wrench in the hands of an assembly technician yields unpredictable results in terms of the tightened condition of a BTC-type nut unless a torque wrench is used, but the latter would be quite cumbersome and would require the concurrent use of a dedicated workstation to hold and secure the coupling during tightening.

Third, even when correctly assembled, it is not possible to determine by visual inspection whether a BTC-type nut has been properly tightened or is in fact loose, a condition that also renders failsafe operation problematic.

Fourth, the use of a threaded nut in a BTC-type design represents, ultimately, a reliance on the frictional forces induced in the threads of the coupling as they are twisted to elastically comply with each other. This is actually a form of clamping, in which the nut functions as a spring, of sorts, due to its elastic character. The reliance on friction, springs or clamping as an attachment scheme is fundamentally unreliable in environments requiring immersion in highly viscous (and therefore lubricating) fluids, such as encountered in a certain class of underground neutrino detectors. Also, friction-based attachments schemes are undermined by vibration, regular or intermittent, e.g. shocks induced by dropping, etc. In industry, nuts installed in mechanically hostile environments typically have some kind of a secondary, positive, mechanical lock to prevent them from backing out. However, these extra parts add complexity, and therefore increase installation difficulty, including the risk of lost parts, or of parts dropped into peripheral instrumentation, possibly resulting in catastrophic damage.

Fifth, the BTC-type threaded nuts are bulky in order to incorporate a set of female threads, as well as to have sufficient structural integrity to withstand assembly wrenching forces. This bulk increases the overall weight of an assembly. It also increases the maximum cross-section of a strut assembly, reducing clearances through any bulkhead.

Sixth, assembly of a threaded BTC-type nut assembly is time-consuming, because the thread engagement must be carefully started and then turned several times, a wrench must be used, and the wrench force must be gauged somehow, possibly requiring the use of a dedicated assembly workstation and torque wrench.

Accordingly, several objects and advantages of the invention described herein, named the Quick Torque Coupling (QTC), are:

First, the QTC eliminates vague and indeterminate conditions of intermediate assembly, such that the assembled condition falls simply into two distinct categories—it is either locked or unlocked. This eliminates the danger of a faulty assembled condition that might fail and/or cause the parent positioning apparatus to be misaligned. Therefore, assembly of the invention is highly reliable and suitable for fail-safe applications, which is an object and advantage.

Second, no wrenches, tools or other loose hardware are required for the primary assembly of the QTC. The QTC is self-contained, so there is no risk of not having a tool available for emergency assembly or disassembly. Also, there is no need for a specialized assembly workstation with tethered tools, and there is no danger of dropping either tools or secondary locking hardware into nearby equipment or instrumentation. Therefore, assembly of the QTC is simple and self-contained, which is an object and advantage.

Third, the physical engagement of the QTC assembly can be readily inspected by eye, and a "go"/"no-go" status of each coupling can be quickly and easily assessed. Therefore the QTC can be simply and easily tested, which is an object and advantage.

Fourth, the QTC locks by direct positive engagement of triply interlocking teeth, eliminating the use of any kind of primary clamping, spring-loaded, or friction based mechanism. Thus, the integrity of the assembled condition of the QTC is fundamentally fail-safe. There is no virtually no danger of unexpected self-disassembly due to the undermining of a threaded coupling by either lubrication and/or vibration or shock. Therefore, the mechanism of the QTC is simple and reliable, which is an object and advantage.

Fifth, the QTC eliminates the need for a bulky and heavy captive nut, substituting a low-profile light-weight locking collar. The QTC is therefore relatively compact and light-weight compared to the prior art, such as the BTC, above, which is an object and advantage.

Sixth, because the QTC is straightforward, simple, and requires no tools, it is therefore relatively rapid to assemble, compared to the prior art. This reduces installation and maintenance time, which is an object and advantage.

Further objects and advantages of the QTC will become apparent from a consideration of the ensuing description and drawings.

SUMMARY OF THE INVENTION

In accordance with the present invention, a mechanical tubular coupling system comprises primarily a pair of toothed rings attached to strut members, these teeth mechanically interlocking in both an axial and circumferential manner, and a third part comprising a sliding, toothed ring that interlocks the teeth of the first two rings, preventing them from disengaging and completely locking the assembly together. A secondary mechanism of any kind may provide a nesting force for the third ring.

In the drawings, closely related figures have the same label number but different alphabetic suffixes.

IDENTIFICATION OF THE REFERENCE NUMBERS

Figure 1A:
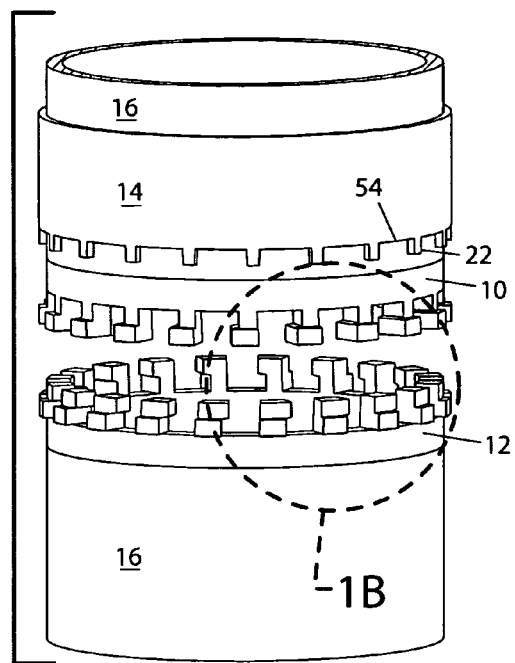
FIG. 1A is an overall view of the invention shown in the disconnected condition, with the upper portion tilted towards the viewer by six degrees.

10: First ring;
12: Second ring;
14: Third or locking ring;
16: Strut segments (two shown);
18: Typical tooth of ring 10;
20: Typical tooth of ring 12;
22: Typical tooth of locking ring 14;
24: Circumferential tab of tooth 18;
26: Circumferential tab of tooth 20;
28: Radial tab of tooth 18;
30: Radial tab of tooth 20;
32: Typical axial contacting region between teeth 18 and ring 12;
34: Typical axial clearance region between teeth 20 and ring 10;
36: Typical rotational contacting region between teeth 18 and 20;
38: Typical rotational clearance region between bases of teeth 18 and ends of teeth 20;
40: Typical rotational clearance region between bases of teeth 20 and ends of teeth 18;
42: Typical axial clearance region between ends of teeth 22 and ring 12;
44: Typical axial contact region between teeth 22 and teeth 18;
46: Typical axial contact region between teeth 22 and teeth 20;
48: Typical axial clearance region between ring 14 and radial tabs 28 and 30;
50: Typical notch between teeth 18 of ring 10;
52: Typical notch between teeth 20 of ring 12;
54: Base of typical notch between teeth 22, corresponding to axial clearance region 48;
56: Portion of notch 52 profile corresponding to axial contact region 32 and axial clearance region 42;
58: Portion of tooth 18 profile corresponding to axial contact region 32;
60: Portion of tooth 20 profile corresponding to rotational clearance region 40;
62: Portion of tooth 18 profile corresponding to rotational clearance region 40;
64: Portion of tooth 20 profile corresponding to rotational contact region 36;
66: Portion of tooth 18 profile corresponding to rotational contact region 36;
68: Portion of tooth 20 profile corresponding to rotational clearance region 38;
70: Portion of tooth 18 profile corresponding rotational clearance region 38;
72: Portion of tooth 20 profile corresponding to axial clearance region 34;
74: Portion of notch 50 profile corresponding to axial clearance region 34;
76: Portion of tooth 20 profile corresponding to axial contact region 46;
78: Portion of tooth 22 profile corresponding to axial contact region 46;
80: Portion of tooth 18 profile corresponding to axial contact region 44;
82: Portion of tooth 22 profile corresponding to axial contact region 44;
84: Portion of tooth 22 profile corresponding to axial clearance region 42;
86: An alternate version of locking ring 14 with an integral flange 88;
88: The flange of ring 88, which facilitates manual operation;
90: A ring with integral spring geometry to supply a nesting force to ring 86;
92: Provision for a snapping action to occur in regions 36;
94: Provision for a snapping action to occur in regions 44;
96: Provision for a snapping action to occur in regions 46;
98: Portion of tooth 20 in provision for snapping action 92;
100: Portion of tooth 20 in provision for snapping action 96;
102: Portion of tooth 18 in provision for snapping action 94;
104: Portion of tooth 18 in provision for snapping action 92;
106: Portion of tooth 22 in provision for snapping action 96;
108: Portion of tooth 22 in provision for snapping action 94;
110: An alternate version of ring 10 without radial tabs 28, for use with locking ring 114;
112: An alternate version of ring 12 without radial tabs 30, for use with locking ring 114; 114: An alternate version of locking ring 14 with extended, flexible teeth that protrude inward at their ends to lock rings 110, 112 together;
116: An alternate version of ring 10 with an internal o-ring groove 120;
118: An alternate version of ring 12 with an integral internal sleeve (o-ring throat) 122;
120: The o-ring groove of ring 116;
122: The internal sleeve of ring 118;
124: O-ring, normally installed in o-ring groove 120;
126: Portion of radial tab 28 associated with clearance region 48;

128: Portion of radial tab 30 associated with clearance region 48.

DETAILED DESCRIPTION OF THE INVENTION

Figure 1C:
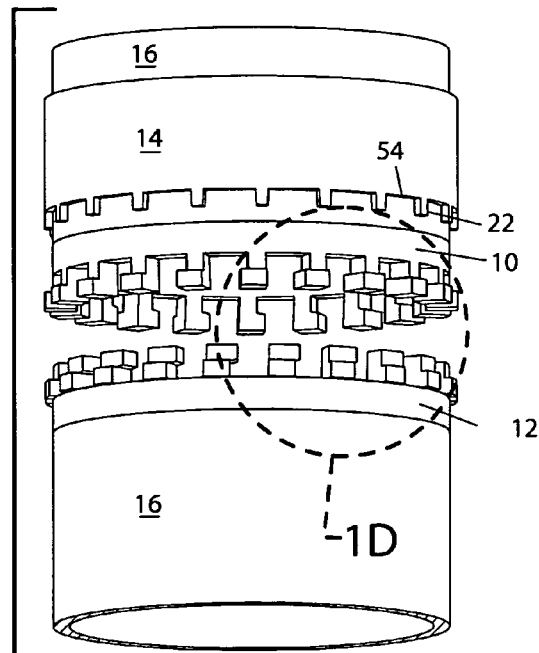
FIG. 1C is similar to FIG. 1A, except that the upper portion is tilted away from the viewer by six degrees.
Figure 1B:
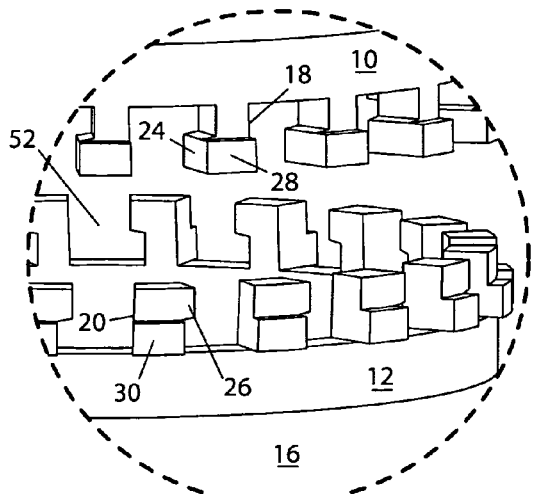
FIG. 1B is an enlarged detail of FIG. 1A.
Figure 1D:
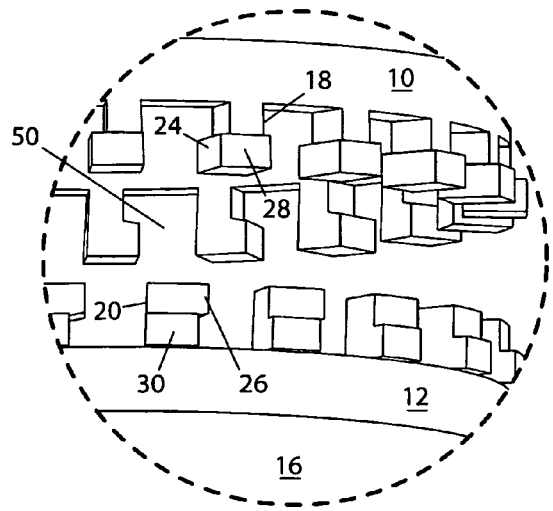
FIG. 1D is an enlarged detail of FIG. 1C.

A preferred embodiment of the present invention is illustrated in FIGS. 1A and 1C, wherein both figures show the disassembled (unlocked) condition of the invention. Two steel or aluminum rings 10 and 12, each with a circumferential array of teeth 18 and 20 respectively, are welded or brazed to the ends of struts 16 such that their teeth extend axially outward. Other materials and/or joining techniques may be used instead. A locking ring 14 is assembled such that it slides over ring 10 with its teeth facing teeth 10. Ring 14 has a set of teeth 22, which engage the teeth 18 and 20 of rings 10 and 12 in the assembled condition. In the embodiment shown, the diameter of the struts 16 is about 3 inches. The wall thickness of the struts is about 1/16 inch, as is that of the ring 14. The teeth 18 and 20, of rings 10 and 12 have radial thickness that varies, but are not diametrically solid.

Although rings 10 and 12 each have a set of interlocking teeth 18 and 20 respectively, each extending axially and spaced at angular intervals, the design of teeth 18 and 20 are distinct. Teeth 18 have a compound tab at the end of the tooth that protrudes both circumferentially 24 and radially outward 28. Teeth 20 have a circumferential tab 26 at its end, and a radial tab 30 at its base that protrudes outward. In the embodiment shown, rings 10 and 12 each have twenty teeth 18 and 20, respectively. Each tooth 18 and 20 is approximately ¼ inch long, and is spaced at regular angular intervals, although a regular interval is not required, per se. For example, some angular irregularity may be desirable to control the engagement orientation of the coupling halves of the invention.

Figure 2A:
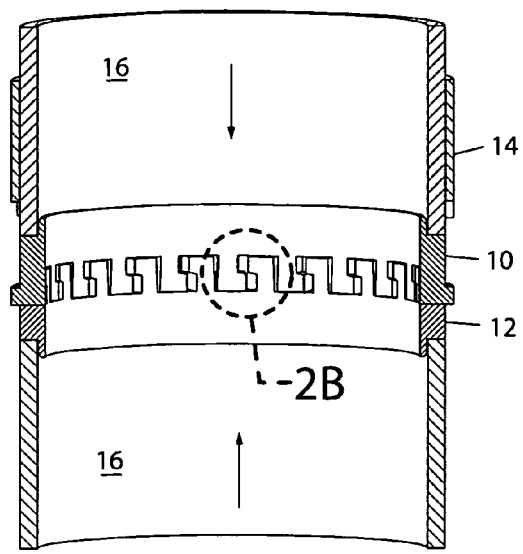
FIG. 2A is similar to FIG. 1A, except that the invention is shown in the first stage of assembly, with the arrows indicating linear motion or force, and with the front half of the invention cut away to reveal the rear half.
Figure 2C:
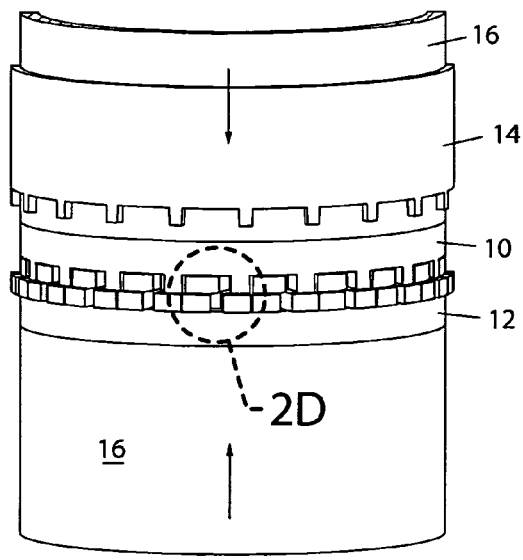
FIG. 2C is similar to FIG. 2A, except that the rear half of the invention has been cut away instead of the front half, for clarity in rendering foreground detail.
Figure 2B:
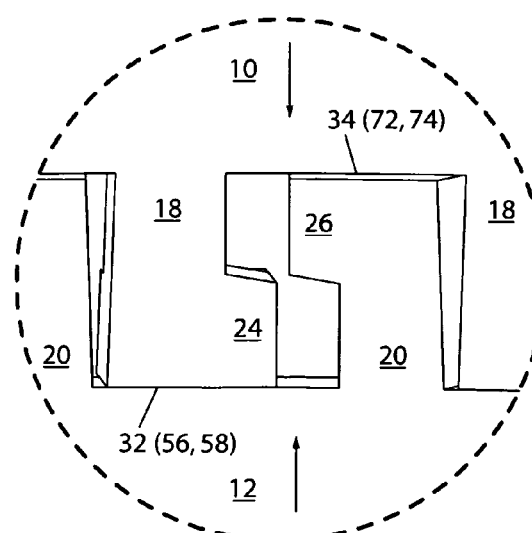
FIG. 2B is an enlarged detail of FIG. 2A.
Figure 2D:
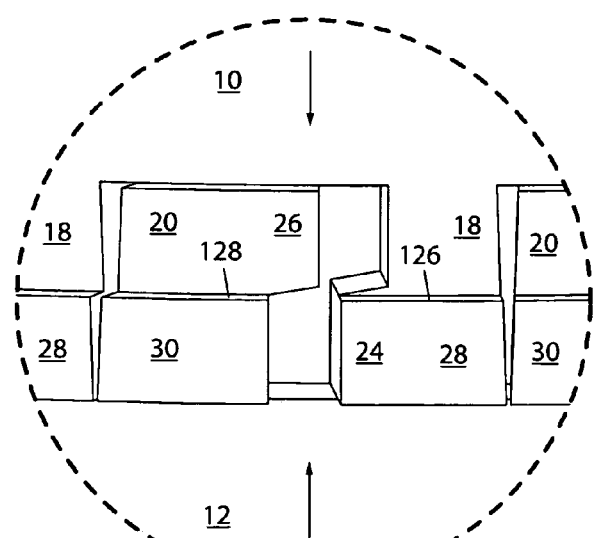
FIG. 2D is an enlarged detail of FIG. 2C.
Figure 3A:
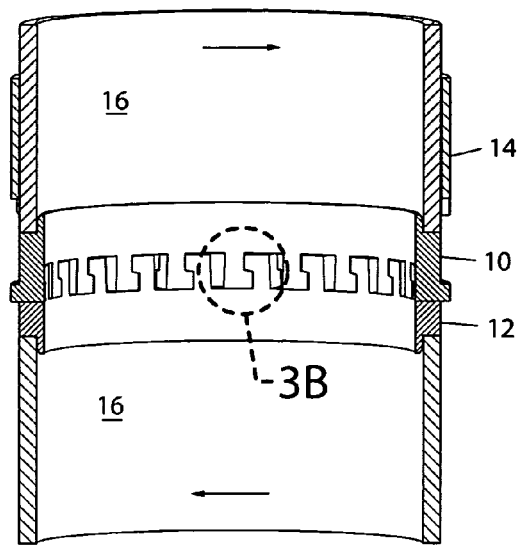
FIG. 3A is similar to FIG. 2A, except that the invention is shown in the second stage of assembly, with the arrows indicating rotational motion or rotational force (torque)
Figure 3C:
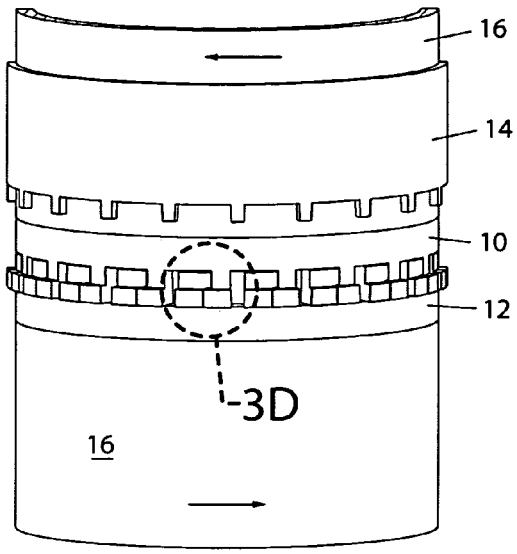
FIG. 3C is similar to FIG. 2C, but showing the second stage of assembly of the invention as in FIG. 3A.
Figure 3B:
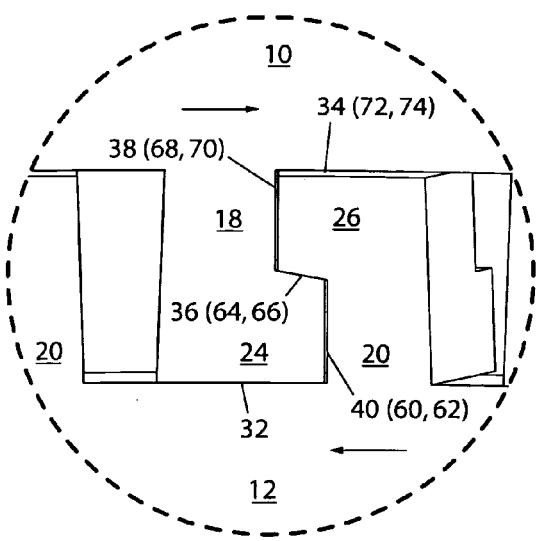
FIG. 3B is an enlarged detail of FIG. 3A.
Figure 3D:
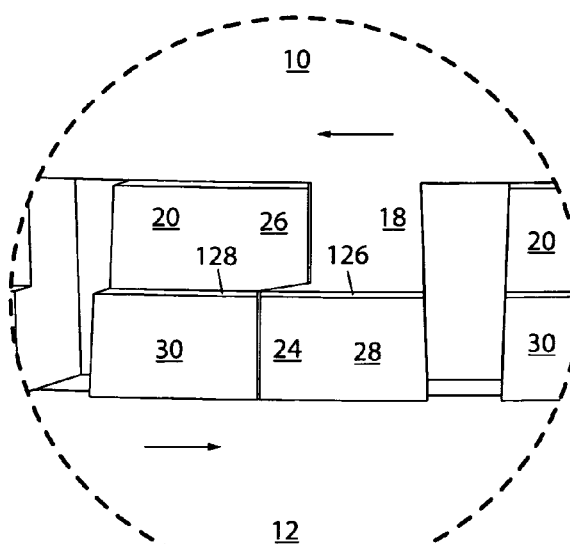
FIG. 3D is an enlarged detail of FIG. 3C.
Figure 4A:
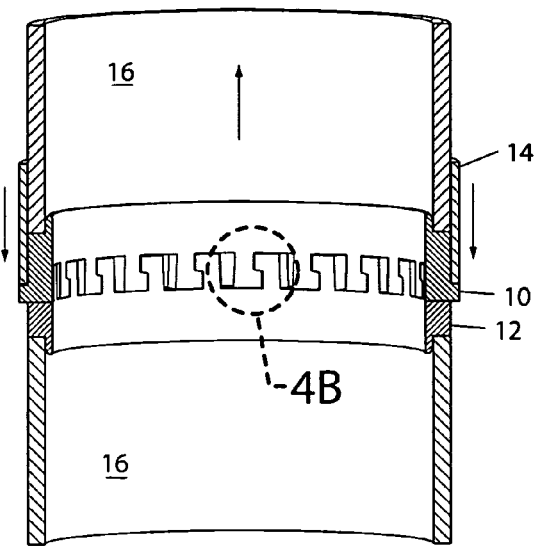
FIG. 4A is similar to FIG. 3A, but showing the third stage of assembly of the invention.
Figure 4C:
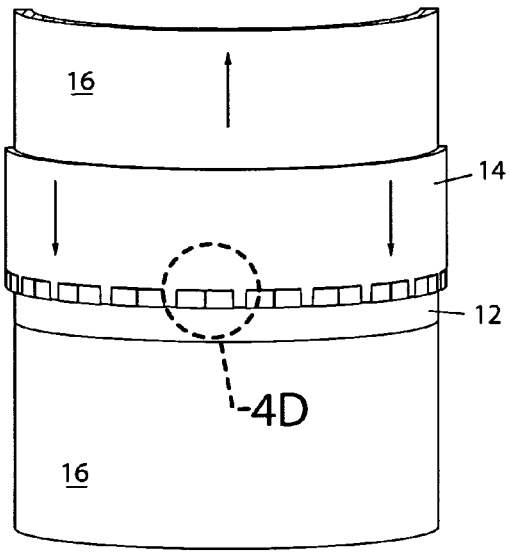
FIG. 4C is similar to FIG. 3C, but showing the third stage of assembly of the invention as in FIG. 4A.
Figure 4B:
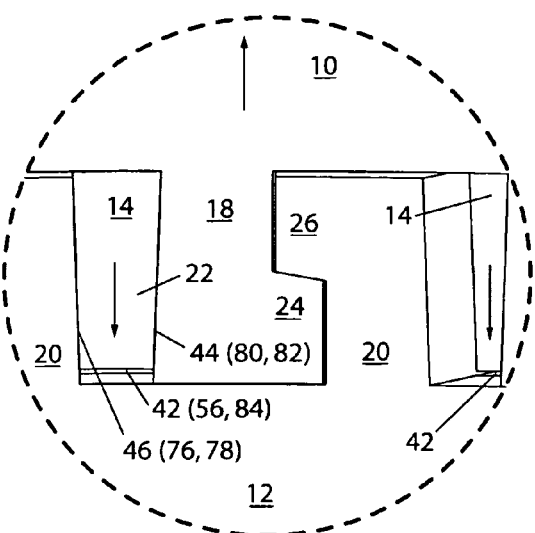
FIG. 4B is an enlarged detail of FIG. 4A.
Figure 4D:
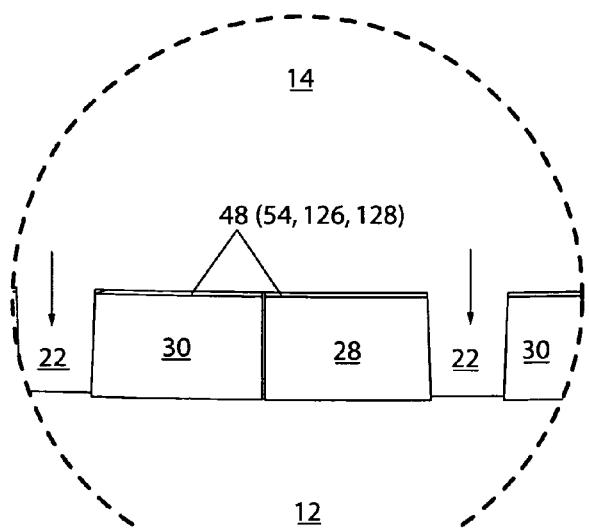
FIG. 4D is an enlarged detail of FIG. 4C.

The first assembly step is shown in FIGS. 2A through 2D. Rings 10,14 and one strut 16 form the upper half of the invention. Ring 12 another strut 16 form the lower half. The two halves are aligned axially, and then pushed into contact with each other as indicated by the opposing arrows. These arrows represent linear motion or force. Detail FIGS. 2B and 2D show the interaction of a pair of teeth 18 and 20 in this state, viewed from opposite sides. The two rings contact at regions 32 between the ends of teeth 18 and notch bases 56. To prevent over-constraint, clearance is provided at the complementary regions 34 between the ends 72 of teeth 20 and notch bases 74.

The second assembly step is shown in FIGS. 3A through 3D. The two halves of the invention are twisted together until the circumferential tabs 24 and 26 engage and interdigitate with each other, as indicated by the opposing arrows. These arrows represent rotational motion or rotational force (torque). Teeth 18 and 20 contact each other at regions 36. The surfaces of tabs 24 and 26 at regions 36 are oriented to create a wedging action in cooperation with the surfaces at regions 32. The collective wedging action of all tabs 24 and 26 axially aligns and centers rings 10 and 12 with respect to each other, and locks them together. The halves of the invention then possess only one degree of freedom, namely the reverse (inverse) of the assembling twist. They can no longer move axially, or be offset, or be further twisted with respect to each other.

The third and final assembly step is shown in FIGS. 4A through 4D. Locking ring 14 is pushed axially by hand or by a secondary mechanism of any kind, which is fixed to the upper half of the invention. An example of such a mechanism is illustrated as ring 90 in FIGS. 6A through 6D. The end of ring 90 opposite the teeth is welded or fixed to strut 16, leaving the other end free to spring-load locking ring 86. In this example, ring 86 is the same as ring 14 except that it has a flange to permit manual operation. A nesting force is thus created on ring 14 with respect to the upper half of the invention. This action and reaction are indicated by the opposing arrows in FIGS. 4A though 4D, which represent linear motion or force. The teeth 22 of ring 14 then engage and interdigitate with the radial tabs 28 and 30 respectively, of teeth 18 and 20. Teeth 22 have a wedge shape, and radial tabs 28 and 30 together form a cooperating wedge shape. Teeth 22 are designed to exactly fill the gap between teeth 18 and 20 resulting from assembly step two, and axial contact occur at regions 44 and 46. To prevent over-constraint, clearance 42 is provided between the ends of the teeth 22 and notch bases 56, and clearance 48 is provided between notch bases 54 and radial tabs 28 and 30. The geometry of this triple interlocking state is designed such that teeth 22 create a wedging action as they engage radial tabs 28 and 30.

Once teeth 22 engage radial tabs 28 and 30, the single remaining degree of freedom remaining after step two is eliminated, and the assembly is completely locked together. Motion between the two assembly halves is positively and physically blocked by the presence of solid material (the triply interlocking teeth). Thus, no unreliable clamping, spring loading, or friction-based attachment of any kind is utilized in this primary locking action.

As noted, locking ring 14 requires a nesting force to maintain its engagement with teeth 18 and 20. This nesting force is very small in relation to the ability of the assembly to resist linear and rotational forces and/or deflection. Therefore, the assembly can be considered a kind of mechanical amplifier, in a very broad sense. Any number of types of secondary mechanisms may be employed to supply this nesting force. Examples include clamping or spring loaded devices (such as the ring 90 shown in FIGS. 6A through 6D) or friction-based attachment (e.g. screws). While a particular nesting force mechanism for the preferred embodiment has been illustrated, any of a plurality of different design solutions are considered to be well known and within the skill of the art. These include designs that are compact, mechanically simple, low-profile and integral to the assembly, and having no loose parts.

Figure 5:
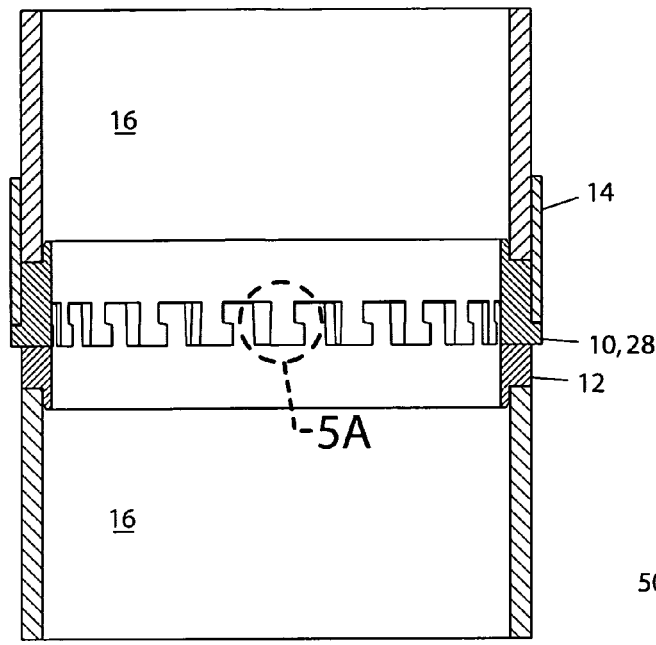
FIG. 5 is similar to FIG. 4A, except that the view is orthogonal with respect to the invention.
Figure 5B:
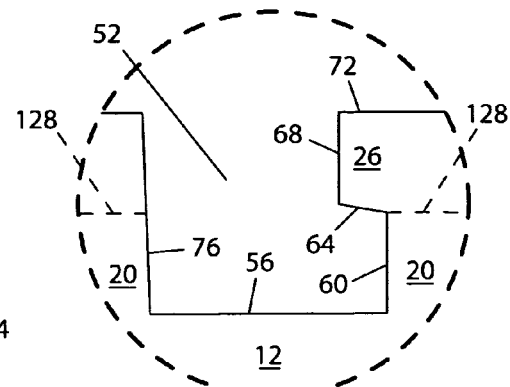
FIG. 5B is identical to FIG. 5A, except that only teeth 20 are shown.
Figure 5C:
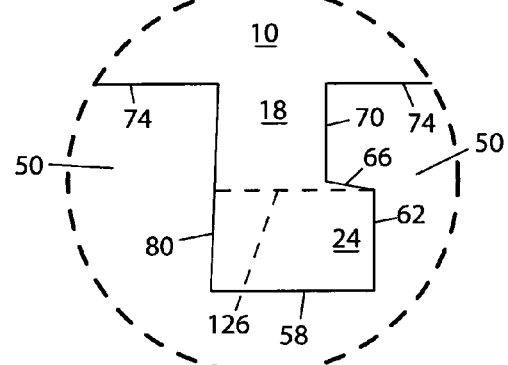
FIG. 5C is identical to FIG. 5A, except that only teeth 18 are shown.
Figure 5A:
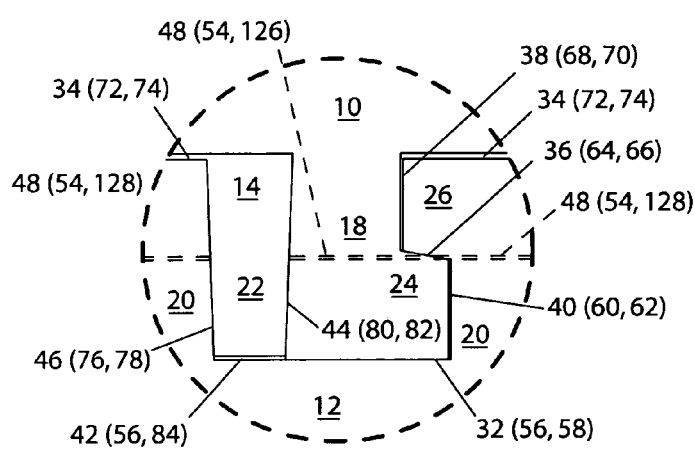
FIG. 5A is an enlarged detail of FIG. 5.
Figure 5D:
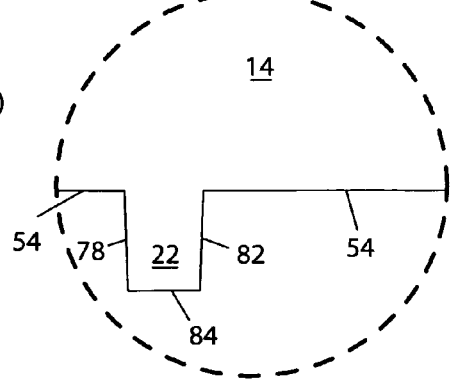
FIG. 5D is identical to FIG. 5A, except that only teeth 22 are shown.
Figure 6A:
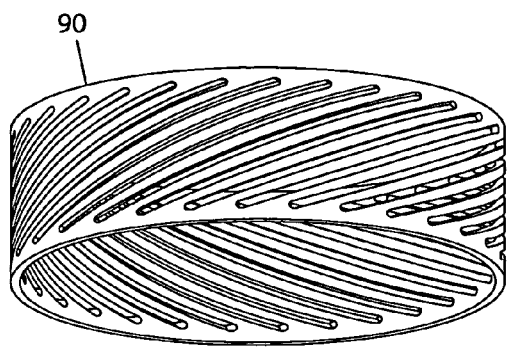
FIG. 6A is a view of an auxiliary ring 90 which supplies a nesting force.
Figure 6C:
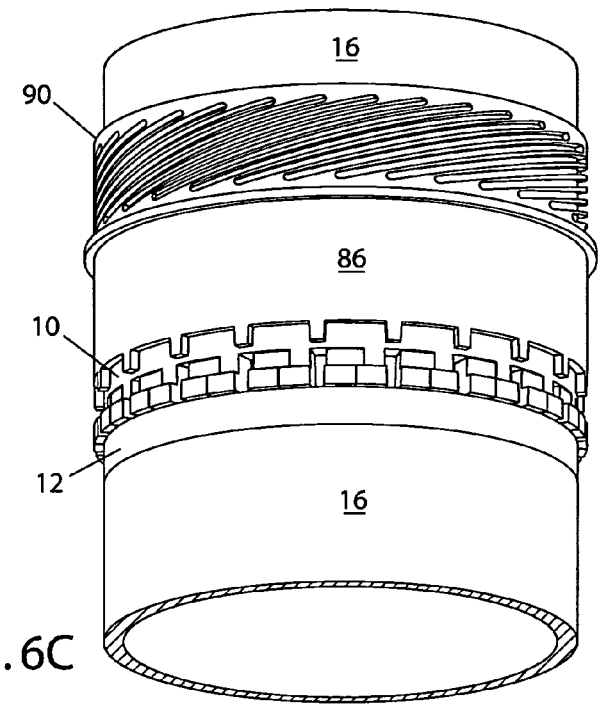
FIG. 6C is a view of an alternative embodiment of the invention, with both auxiliary nesting force ring 90 and modified locking ring 86 in the retracted (unlocked) position.
Figure 6B:
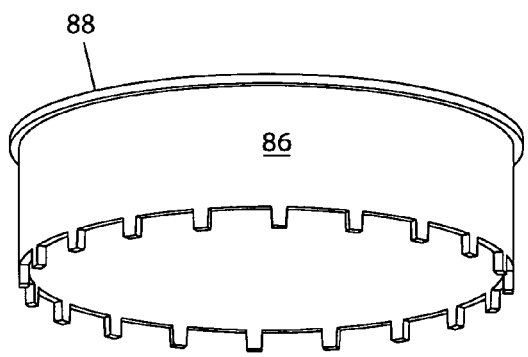
FIG. 6B is a view of an alternative version 86 of locking ring 14, incorporating a supplementary flange 88 to facilitate manual operation.
Figure 6D:
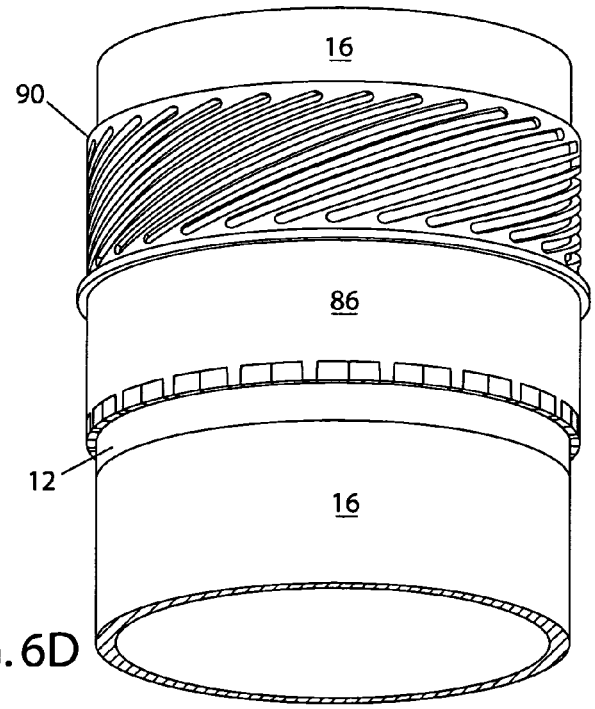
FIG. 6D is a view of an alternative embodiment of the invention, with both auxiliary nesting force ring 90 and modified locking ring 86 in the extended (locked) position.
Figure 7A:
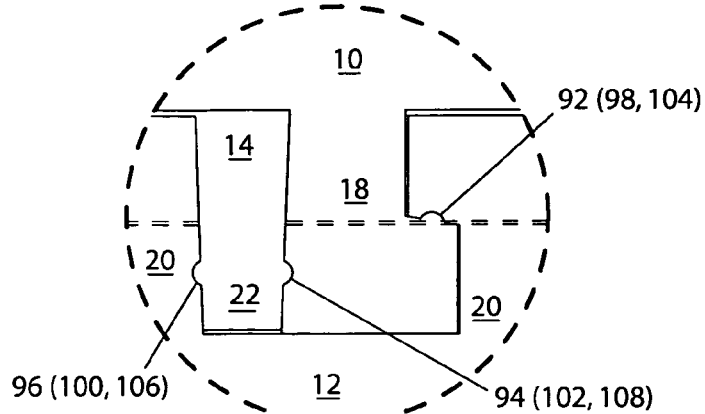
FIG. 7A is similar to FIG. 5A, except that additional geometry 92, 94, 96 has been incorporated in teeth 18, 20 and 22 to provide for a snapping action when they are engaged.
Figure 7B:
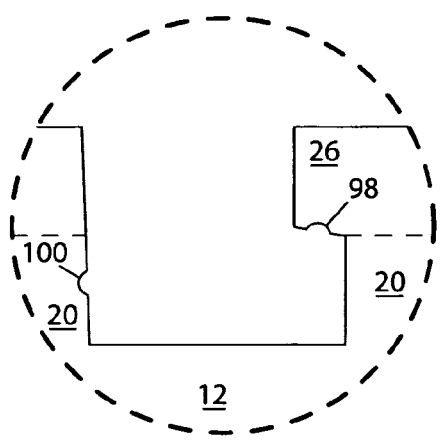
FIG. 7B is similar to FIG. 7A except that only teeth 20 are shown.
Figure 7C:
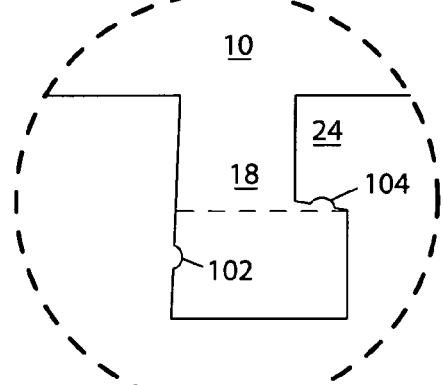
FIG. 7C is similar to FIG. 7A except that only tooth 18 is shown.
Figure 7D:
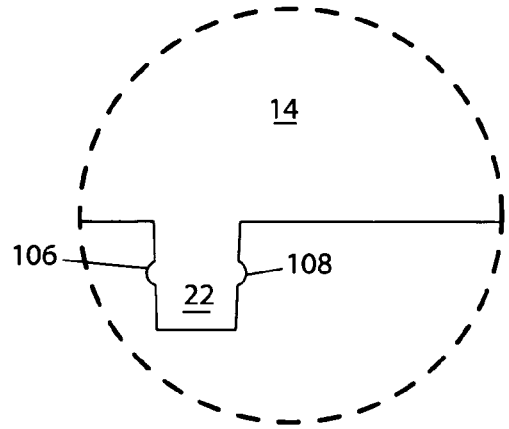
FIG. 7D is similar to FIG. 7A except that only tooth 22 is shown.

FIG. 5a shows the triply interlocking state of one set of teeth 18, 20 and 22 in a profile view. Related FIGS. 5B through 5D preserve this view orientation, showing each of these teeth separately. In this view orientation teeth profiles 18 and 22, and notch 52 profile are shown simultaneously perpendicular to the drawing plane, and thus the principal axis of the invention. This is also the orientation required to machine them, e.g. using Computer Numerically Controlled (CNC) machining. Any circumferential indexing scheme may be used to machine each profile incrementally around the circumference of each ring 10, 12, or 14. Teeth profiles 18, 20 and 22 are thus designed to concurrently cooperate with each other. For example, surfaces 56 and 58 cooperate to form axial contact regions 32, surfaces 64 and 66 cooperate to form rotational contact regions 36, surfaces 80 and 82 cooperate to form axial contact regions 44, and so forth. It should also be pointed out that although teeth 18 and 22 have simple profiles by design, notch 52 is explicitly designed to cooperate with them, and not tooth 20 per se. For this reason, tooth 20 does not have a simple profile.

In an alternative embodiment, radial tabs 28 and 30 of rings 10 and 12 protrude radially inward rather than outward. Thus, in order to engage them, locking ring 14 is internal to rings 10 and 12, instead of external.

In a different alternative embodiment, rings 10 and 12 may be integral with their respective struts 16, depending on the material selection and fabrication method. That is, ring 10 and strut 16 would comprise a single part, etc. For example, plastic injection molding, and even Micro-Electro-Machining Systems (MEMS) technology would support this topology. Of course, this integration could also be achieved using CNC machining techniques.

In a different alternate embodiment illustrated in FIGS. 7A through 7D, circumferential tabs 24 and 26 may be shaped to snap together instead of or in addition to wedging, and similarly for the interface between teeth 22 and teeth 18, 20. Such an embodiment may obviate the need to supply a separate nesting force to ring 14 (as shown in FIGS. 6A-6D).

In a different alternative embodiment (not shown), the triply interlocking condition is obtained by the concurrent cooperation of profiles of teeth 20, 22 and notches 50 together, rather than teeth 18, 22 and notches 52 together.

Figure 8A:
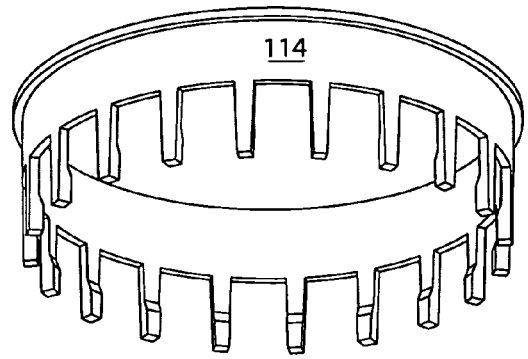
FIG. 8A is a view of an alternative version 114 of ring 14 with extended, flexile teeth.
Figure 8B:
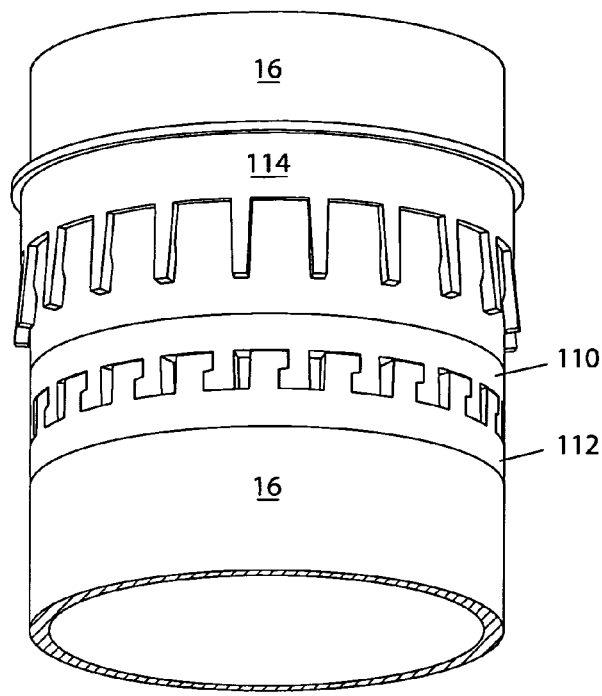
FIG. 8B is a view of alternative embodiment of the invention, showing alternate versions 1 10, 1 12, respectively, of rings 10, 12, and alternate version 114 of ring 14, the latter shown disengaged from rings 110, 112 (unlocked)
Figure 8C:
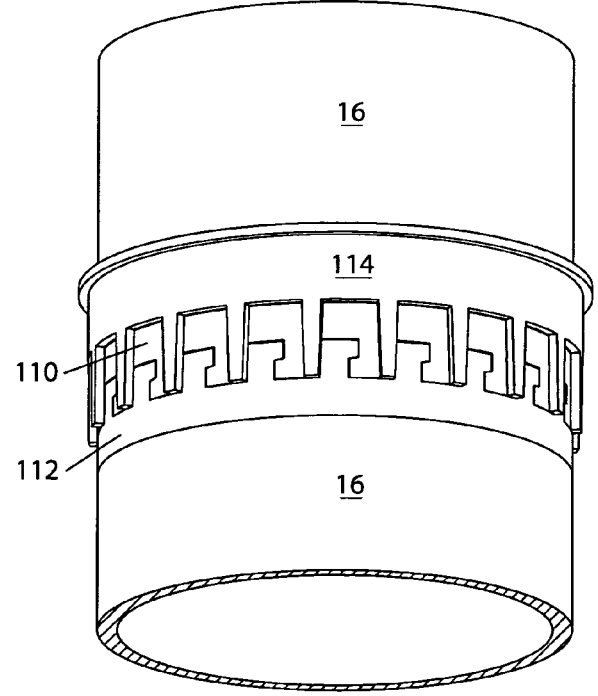
FIG. 8C is similar to FIG. 8B, except that ring 114 is shown engaged with rings 110, 112 (locked)

In a different alternative embodiment, illustrated in FIGS. 8A through 8C, radial tabs 28 and 30 are omitted, transforming rings 10, 12 into rings 110, 112. Also, Teeth 22 are elongated so that they may flex, and additional thickness is added on their inside ends, resulting in ring 114, shown. When ring 114 is translated over engaged rings 110 and 112, teeth 22 snap into the cavities of the engaged teeth of rings 110, 112, locking them all together. This design may also obviate the need to supply a separate nesting force to ring 14 (as shown in FIGS. 6A-6D).

Figure 9A:
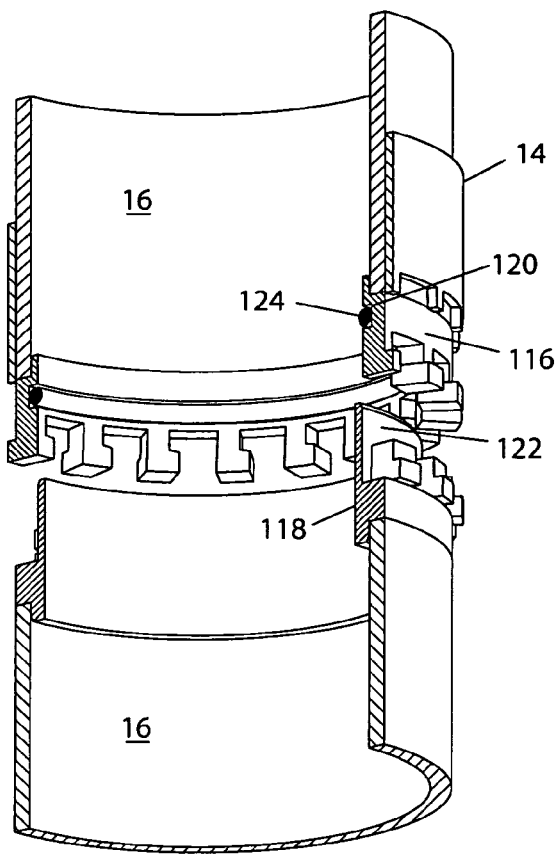
FIG. 9A is a view of an alternative embodiment of the invention in the disconnected (unlocked) condition, showing alternate versions 116, 118, respectively of rings 10, 12, which have been modified to incorporate an O-ring seal for fluid conveyance.
Figure 9B:
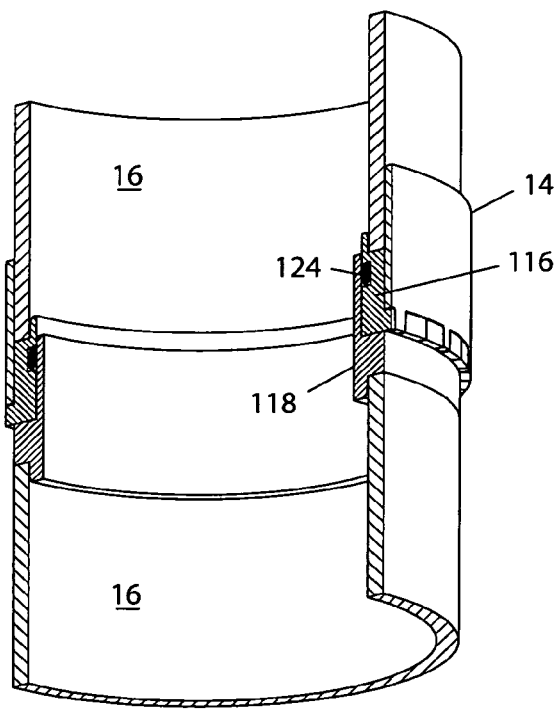
FIG. 9B is similar to FIG. 9A, except that the invention is shown connected (locked)

In a different alternative embodiment illustrated in FIGS. 9A and 9B, ring 10 is provided with an integral o-ring groove 120, transforming it into ring 116. Also, ring 12 is provided with an integral sleeve (o-ring throat) 122, transforming it into ring 118. When rings 116 and 118 are engaged with an o-ring 124 installed in groove 120, the coupling becomes liquid tight and can be used for fluid conduits, such as casings or risers in the oil industry.

In principle, the design of the invention permits the number of teeth 18 or 20 to be chosen freely as a design parameter. For example, the preferred embodiment illustrates a twenty-tooth configuration per ring, spaced at regular angular intervals. However, it should be noted that while this choice is arbitrary, two parameters may constrain it. These are the nominal magnitudes of the axial and circumferential engagement of teeth 18 and 20. For example, if the axial engagement is on the order of ¼ inch, a circumferential engagement of two inches may be impractical. Also, a three inch diameter strut 16 will support a population of about twenty ¼ inch wide teeth per each ring 10 and 12. Obviously, more teeth of the same size wouldn't fit, but a larger population of narrower teeth, or a smaller population of wider teeth might be less efficient in contributing to the total strength and stiffness of the assembly, for various reasons.

The preferred embodiment illustrates a regular angular interval of teeth 18 and 20. This interval need not be regular, or it may be intermittently regular. The choice allows the angular orientation of engagement to be controlled. An example of this would be the field assembly of a positioning arm from a series of segments with couplings on the ends. A controlled assembly alignment would prevent mis-assembly of the arm; the latter would impair its function as a fiducial device.

The triply interlocking condition illustrated in FIGS. 5A through 5D implies that the profiles of sets of teeth 18 and 22, and notches 52 need to be simultaneously perpendicular to a reference plane, and particularly the main axis of the invention, but this may not necessarily be so. So, for example, the orientation of axial contact regions 44 and 46 might not be mutually parallel to the same reference surface as for circumferential contact region 36 (in fact they might still function without being mutually parallel to any reference surface). Similar arguments can be made for the other cooperating surfaces without substantially altering the function or intrinsic attributes of the invention. The point is that small variations or permutations in cooperating surfaces (e.g. 32, 36, 44, 46, etc.) can be made without affecting functionality.

A final point of clarification on the function of the wedge geometry of the invention should be made. The Quick Torque Coupling (QTC) is in principle an "exact-constraint" device. This means that it achieves its rigidity by removing exactly six degrees of freedom—three degrees of translation (in X, Y, Z) and three degrees of rotation (in XY, XZ, and YZ). As mentioned, this is to avoid any direct reliance on friction, clamping, or spring loading, because these methods can be unreliable and inaccurate in precision couplings, although they may be used to advantage to supply a secondary, nesting force to the locking ring. Therefore, the function of the wedging action between tabs and teeth as described herein is to sequentially eliminate axial, radial, and circumferential clearance, and therefore motion, between the coupling halves, and is categorically not used to retain the teeth by wedge friction, per se.

Accordingly, the reader will see that the invention provides a highly reliable precision coupling for the fast and easy assembly of precision portable positioning devices and space frames. The QTC requires no troublesome external tools to operate—it is completely self-contained. There is no risk of dropping a tool into a sensitive peripheral area, and assembly can be handled with gloved hands in difficult conditions. Because of it's easily verifiable "go" or "no-go" condition, the QTC eliminates uncertainty at assembly—it is clearly locked or unlocked. No gauging or torque wrenching is required. The QTC is compact and relatively light-weight. Because of it's triply interlocking teeth, the QTC is rigid. Also, it does not rely primarily on clamps, springs or friction based fasteners, which can fail in demanding situations.

While the above description contains many specificities, these should not be construed as limitations on the scope of the invention, but as exemplifications of the presently preferred embodiments thereof. Many other ramification and variations are possible within the teachings of the invention. Applications are also envisioned for tripods, sailboat and antenna masts, telescopes, flag poles, quick release couplings, tent poles, fishing rods, sign posts, MEMS devices, space station structures, and more.

Thus the scope of the invention should be determined by the appended claims and their legal equivalents, and not by the examples given above.

I claim:

1. A coupling for securing a first component to a second component, the coupling comprising:
    a first tubular member which is attached to or formed integrally with the first component and which includes a plurality of first teeth that extend axially from an end of the first tubular member;
    a second tubular member which is attached to or formed integrally with the second component and which includes a plurality of second teeth that extend axially from an end of the second tubular member;
    each of the first teeth comprising a first radial surface and a first circumferential surface;
    each of the second teeth comprising a second radial surface and a second circumferential surface;
    wherein when the first tubular member is assembled with the second tubular member, each first circumferential surface engages a corresponding second circumferential surface to thereby restrict axial movement of the first tubular member relative to the second tubular member;
a third tubular member which is slidably supported on the first tubular member and which includes a plurality of third teeth that extend axially from an end of the third tubular member;
wherein when the third tubular member is assembled with the first and second tubular members, each third tooth engages the first and second radial surfaces of a corresponding pair of first and second teeth to thereby restrict circumferential movement of the first tubular member relative to the second tubular member,
wherein each first tooth comprises a first radially extending tab portion on which the first radial surface is formed and a first circumferential tab portion on which the first circumferential surface is formed, and each second tooth comprises a second radially extending tab portion on which the second radial surface is formed and a second circumferential tab portion on which the second circumferential surface is formed.

2. The coupling of claim 1, wherein the first and second radial tab portions extend outwardly from their respective first and second tubular members and the inner diameter of the third tubular member is greater than the outer diameter of the first tubular member.

3. The coupling of claim 1, wherein the first and second radial tab portions extend inwardly from their respective first and second tubular members and the outer diameter of the third tubular member is less than the inner diameter of the first tubular member.

4. The coupling of claim 1, wherein each first circumferential tab portion comprises a first generally wedge-shaped configuration, each second circumferential tab portion comprises a second generally wedge-shaped configuration which is complimentary to the first wedge-shaped configuration, and upon assembly of the first and second tubular members, each first circumferential tab portion will become wedged between its corresponding second circumferential tab portion arid the end of the second tubular member to thereby retain the first and second teeth in engagement.

5. The coupling of claim 1, wherein the first and second circumferential tab portions are configured such that, upon assembly of the first and second tubular members, each first circumferential tab portion will snap together with its corresponding second circumferential tab portion to thereby retain the first and second teeth in engagement.

6. The coupling of claim 1, wherein the axial length of the first teeth is greater than the axial length of the second teeth.

7. The coupling of claim 1, wherein each first radial tab portion comprises a first generally wedge-shaped configuration, each second radial tab-portion comprises a second generally wedge-shaped configuration, each third tooth comprises a third generally wedge-shaped configuration which is complimentary to both the first and second wedge-shaped configurations, and upon assembly of the first and second tubular members, each third tooth will become wedged between the first and second radial tab portions of its corresponding pair of first and second teeth to thereby retain the third teeth in engagement with the first and second teeth.

8. The coupling of claim 1, wherein the third teeth and at least one of the first and second radial tab portions are configured such that, upon assembly of the first and second tubular members, each third tooth will snap together with at least one of the first and second radial tab portions of its corresponding pair of first and second teeth to thereby retain the third teeth in engagement with the first and second teeth.

9. The coupling of claim 1, further comprising means for maintaining the third tubular member assembled with the first and second tubular members.

10. The coupling of claim 9, wherein the maintaining means comprises a spring-loaded locking ring which includes a first end that abuts the third tubular member and a second end that is attached to at least one of the first component and the first tubular member.

11. The coupling of claim 9, wherein the maintaining means comprises a snap interface between at least one third tooth and at least one of the first and second radial surfaces of the corresponding pair of first and second teeth.

12. The coupling of claim 9, wherein the maintaining means comprises an end portion of at least one third tooth which is biased into a cavity formed between the first and second radial surfaces of the corresponding pair of first and second teeth.

13. The coupling of claim 1, further comprising means for sealing between the first and second tubular members.

14. A coupling for securing a first component to a second component, the coupling comprising:
a first tubular member which is attached to or formed integrally with the first component and which includes a plurality of first teeth that extend axially from an end of the first tubular member;
a second tubular member which is attached to or formed integrally with the second component and which includes a plurality of second teeth that extend axially from an end of the second tubular member;
each of the first teeth comprising a first circumferential tab portion and a first radially extending tab portion which includes a generally axial first sidewall located opposite the first circumferential tab portion;
each of the second teeth comprising a second circumferential tab portion and a second radially extending tab portion which includes a generally axial second sidewall located opposite the second circumferential tab portion;
a third tubular member which is slidably supported on the first tubular member and which includes a plurality of third teeth that extend axially from an end of the third tubular member;
wherein when the first tubular member is assembled with the second tubular member, each first circumferential tab portion engages a corresponding second circumferential tab portion to thereby restrict axial movement of the first tubular member relative to the second tubular member;
wherein when the third tubular member is assembled with the first and second tubular members, each third tooth engages the first and second sidewalls of a corresponding pair of first and second teeth to thereby restrict circumferential movement of the first tubular member relative to the second tubular member.

15. The coupling of claim 14, wherein the first and second radial tab portions extend outwardly from their respective first and second tubular members and the inner diameter of the third tubular member is greater than the outer diameter of the first tubular member.

16. The coupling of claim 14, wherein the first and second radial tab portions extend inwardly from their respective first and second tubular members and the outer diameter of the third tubular member is less than the inner diameter of the first tubular member.

17. The coupling of claim 14, wherein each first circumferential tab portion comprises a first generally wedge-shaped configuration, each second circumferential tab portion comprises a second generally wedge-shaped configuration which is complimentary to the first wedge-shaped configuration, and upon assembly of the first and second tubular members, each first circumferential tab portion will become wedged between its corresponding second circumferential tab portion and the end of the second tubular member to thereby retain the first and second teeth in engagement.

18. The coupling of claim 14, wherein the first and second circumferential tab portions are configured such that, upon assembly of the first and second tubular members, each first circumferential tab portion will snap together with its corresponding second circumferential tab portion to thereby retain the first and second teeth in engagement.

19. The coupling of claim 14, wherein the axial length of the first teeth is greater than the axial length of the second teeth.

20. The coupling of claim 14, wherein each first radial tab portion comprises a first generally wedge-shaped configuration, each second radial tab-portion comprises a second generally wedge-shaped configuration, each third tooth comprises a third generally wedge-shaped configuration which is complimentary to both the first and second wedge-shaped configurations, and upon assembly of the first and second tubular members, each third tooth will become wedged between the first and second sidewalls of its corresponding pair of first and second teeth to thereby retain the third teeth in engagement with the first and second teeth.

21. The coupling of claim 14, wherein the third teeth and at least one of the first and second sidewalls are configured such that, upon assembly of the first and second tubular members, each third tooth will snap together with at least one of the first and second radial tab portions of its corresponding pair of first and second teeth to thereby retain the third teeth in engagement with the first and second teeth.

22. The coupling of claim 14, further comprising means for maintaining the third tubular member assembled with the first and second tubular members.

23. The coupling of claim 14, wherein each first radial tab portion is located adjacent the distal end of its corresponding tooth.

24. The coupling of claim 14, wherein each second radial tab portion is located adjacent the proximal end of its corresponding tooth.

* * * * *